US009807854B2

(12) United States Patent
Nakano (10) Patent No.: US 9,807,854 B2
(45) Date of Patent: Oct. 31, 2017

(54) ILLUMINATION DEVICE, AND FRAME PROVIDED WITH THE SAME

(71) Applicant: AG Inc., Osaka-shi, Osaka (JP)

(72) Inventor: Kazuo Nakano, Osaka (JP)

(73) Assignee: AG INC., Osaka-Shi, Osaka (JP)

( * ) Notice: Subject to any disclaimer, the term of this patent is extended or adjusted under 35 U.S.C. 154(b) by 0 days.

(21) Appl. No.: 15/107,720

(22) PCT Filed: Dec. 24, 2014

(86) PCT No.: PCT/JP2014/084173
§ 371 (c)(1),
(2) Date: Jun. 23, 2016

(87) PCT Pub. No.: WO2015/098974
PCT Pub. Date: Jul. 2, 2015

(65) Prior Publication Data
US 2016/0323973 A1    Nov. 3, 2016

(30) Foreign Application Priority Data

Dec. 24, 2013   (JP) .................................. 2013-265341

(51) Int. Cl.
*H01L 51/50*   (2006.01)
*H05B 37/02*   (2006.01)
(Continued)

(52) U.S. Cl.
CPC ..... *H05B 37/0236* (2013.01); *F21V 33/0032* (2013.01); *H05B 37/029* (2013.01);
(Continued)

(58) Field of Classification Search
CPC ............ H05B 37/0218; H05B 33/0863; H05B 37/0227; H05B 37/02; H05B 37/0272;
(Continued)

(56) References Cited

U.S. PATENT DOCUMENTS 5,866,994 A * 2/1999 Nakano ................ H05B 37/029
                                                315/186
6,036,334 A * 3/2000 Nakano ................... F21V 23/04
                                                362/228
2009/0040756 A1* 2/2009 Avtzon .................... F21S 6/001
                                                362/234

FOREIGN PATENT DOCUMENTS

JP          2880476 B2    4/1999
JP       2010-263040 A   11/2010

OTHER PUBLICATIONS

Author: Koriyama Koichi, Title: Lighting device and Lighting system JP2010263040, Date: Nov. 18, 2010 (Translation).*
(Continued)

*Primary Examiner* — Douglas W Owens
*Assistant Examiner* — Wei Chan
(74) *Attorney, Agent, or Firm* — Manabu Kanesaka (57) ABSTRACT

An illumination device includes a signal reception unit capable of receiving an audio signal from outside, a musical piece extraction unit capable of extracting continuous consonant sounds in the audio signal as a musical piece, a performance state detection unit capable of detecting start/end of performance of the musical piece according to a result of extraction by the musical piece extraction unit, a first illumination lamp capable of radiating ultraviolet rays, a second illumination lamp capable of radiating white light, and an illumination control unit capable of controlling on/off of the first illumination lamp, and of controlling on/off and illuminance of the second illumination lamp, The first and the second illumination lamps are turned on in response to detection of the start of performance, and the first and the second illumination lamps are turned off in response to detection of the end of performance.

11 Claims, 10 Drawing Sheets

(51) Int. Cl.
*F21V 33/00* (2006.01)
*G10L 25/78* (2013.01)
*G10L 25/18* (2013.01)

(52) U.S. Cl.
CPC . *G10H 2210/046* (2013.01); *G10H 2210/051* (2013.01); *G10H 2250/235* (2013.01); *G10L 25/18* (2013.01); *G10L 25/78* (2013.01)

(58) Field of Classification Search
CPC ............ H05B 37/0281; H05B 33/0842; H05B 33/0845; H05B 33/0869; H05B 37/0236; H05B 33/0812; H05B 33/0857; H05B 37/0209; F21V 19/02; F21V 21/02; F21V 21/30; F21V 23/0464; F21V 23/0471; F21V 23/0478; F21V 29/74; F21V 14/02; F21V 23/0442; F21V 29/59; F21V 35/00; F21Y 2113/00; F21Y 2101/00; F21Y 2105/10
USPC ................. 362/234, 84, 228, 240, 247, 812; 315/360, 316, 314, 291, 324, 292, 362
See application file for complete search history.

(56) References Cited

OTHER PUBLICATIONS

Author: Koriyama Koichi, Title: Lighting device and Lighting system JP2010263040, Date: Nov. 18, 2010.*
PCT International Search Report of PCT/JP2014/084173.

\* cited by examiner

First Control Pattern

FIG. 8(b)

Second Control Pattern

FIG. 8(c)

Third Control Pattern

FIG. 9(a)

Example modification of control pattern

FIG. 9(b)

Another Example modification of control pattern

FIG. 10

ILLUMINATION DEVICE, AND FRAME PROVIDED WITH THE SAME

RELATED APPLICATIONS

The present application is National Phase of International Application No. PCT/JP2014/084173 filed Dec. 24, 2014, and claims priority from Japanese Application No. 2013-265341, filed Dec. 24, 2013, the disclosure of which is hereby incorporated by reference herein in its entirety.

TECHNICAL FIELD

The present invention relates to a technical field of an illumination device used to irradiate a painting, a poster or a copy thereof (hereinafter referred to as a painting or the like), and a technical field of a frame which is provided with such an illumination device.

BACKGROUND ART

Conventionally, there are illumination devices for illuminating a painting or the like expressing at the same time a daytime scenery and a nighttime scenery by using a special paint which is caused by ultraviolet rays to emit or reflect light (see Patent Literature 1, for example). According to this type of illumination device, due consideration is given to ensure that the difference between a daytime scenery and a nighttime scenery is fully expressed. Also, this type of illumination device allows viewing of a painting or the like in a state according to a gradual change in the nature from a daytime scenery to a nighttime scenery, and allows a viewer of the painting or the like to feel the sense of ambience.

CITATION LIST

Patent Literature

Patent Literature 1: JP 2880476 B1

SUMMARY OF THE INVENTION

Technical Problems

Now, there are some viewers of paintings or the like who want to enjoy viewing a painting or the like while listening to a musical piece which is suitable for the painting or the like, or who want to enjoy viewing a painting or the like while listening to a musical piece they like. That is, there are some viewers of paintings or the like who want to enjoy viewing a painting or the like while listening to a musical piece, with sound providing a great sense of ambience.

However, although the illumination device disclosed in Patent Literature 1 is able to meet the demand of viewers who want to enjoy viewing a painting or the like in a state according to a change in the nature, it cannot meet the demand of viewers who want to enjoy viewing a painting or the like while listening to a musical piece, with sound providing a great sense of ambience.

Accordingly, the present invention has its aim to provide an illumination device that can fully meet the demand of viewers who want to enjoy viewing paintings or the like with sound providing a great sense of ambience, and a frame provided with the illumination device.

Solution to Problems (1) An illumination device of the present invention includes a signal reception unit capable of receiving an audio signal from outside, a musical piece extraction unit capable of extracting continuous consonant sounds in the audio signal as a musical piece, a performance state detection unit capable of detecting start/end of performance of the musical piece according to a result of extraction by the musical piece extraction unit, a first illumination lamp capable of radiating ultraviolet rays, a second illumination lamp capable of radiating white light, and an illumination control unit capable of controlling on/off of the first illumination lamp, and of controlling on/off and illuminance of the second illumination lamp, where the illumination control unit controls the second illumination lamp to repeat a pattern in which illuminance is gradually increased in a first predetermined period of time that is set in advance starting from an off state, maximum illuminance is maintained in a second predetermined period of time that is set in advance and that follows the first predetermined period of time, the illuminance is gradually reduced in a third predetermined period of time that is set in advance and that follows the second predetermined period of time, and the off state is maintained in a fourth predetermined period of time that is set in advance and that follows the third predetermined period of time, controls the first illumination lamp to repeat a pattern of being turned off in a fifth predetermined period of time that is set in advance and that is during a time when the second illumination lamp is turned on, and being turned on in a sixth predetermined period of time that is set in advance and that includes a time when the second illumination lamp is turned off, causes the first and the second illumination lamps to be turned on in response to detection of the start of performance by the performance state detection unit, and causes the first and the second illumination lamps to be turned off in response to detection of the end of performance by the performance state detection unit. The "audio signal" here refers to a signal of a musical piece to which noises are added, and in the present invention, continuous consonant sounds in the audio signal are extracted by the musical piece extraction unit as the sound of a musical piece, but discontinuous dissonant sounds in the audio signal are treated as the sound of people walking or environmental sound and are not extracted by the musical piece extraction unit.

According to the configuration of (1), the second illumination lamp, which is capable of radiating white light, repeats a predetermined control pattern of increasing and reducing the illuminance over time, and the first illumination lamp, which is capable of radiating ultraviolet rays, is turned off during a predetermined period of time when the second illumination lamp is turned on. Accordingly, by being used on a painting or the like which is partially painted with special paint that emits light or reflects ultraviolet rays when irradiated with ultraviolet rays, the illumination device may allow a viewer to perceive a change in the expression of the painting or the like with a great sense of ambience and a great sense of surprise, and may thus offer the viewer deep relaxation.

Furthermore, according to the configuration of (1), the illumination control unit causes the first and the second illumination lamps to be turned on in response to detection of the start of performance by the performance state detection unit, and causes the first and the second illumination lamps to be turned off in response to detection of the end of performance by the performance state detection unit, and thus the past demand of viewers who wanted to enjoy viewing a painting or the like while listening to a musical piece, with sound providing a great sense of ambience, may be fully met. Accordingly, viewers may experience even deeper relaxation by listening to a musical piece while viewing a painting or the like.

(2) According to the illumination device of (1), preferably, the musical piece extraction unit includes a data conversion unit capable of generating frequency data by applying Fourier transform on data of the audio signal, a band extraction unit capable of extracting data of a specific band corresponding to the continuous consonant sounds from the frequency data, and a musical piece presence determination unit for determining that the musical piece is present in the audio signal, in response to extraction of the data of the specific band by the band extraction unit.

According to the configuration of (2), since there is provided the band extraction unit that is capable of extracting data of a specific band corresponding to the continuous consonant sounds from the frequency data, the musical piece presence determination unit may easily determine whether a musical piece is present in the audio signal or not simply based on the result of extraction by the band extraction unit.

(3) According to the illumination device of (2), preferably, the performance state detection unit detects the start of performance when the musical piece presence determination unit determines that the musical piece is present in the audio signal, and detects the end of performance when a state where the data of the specific band is not extracted by the band extraction unit continues for a period of time that is set in advance.

According to the configuration of (3), the performance state detection unit may easily detect start/end of performance according to each output of the musical piece presence determination unit/the band extraction unit.

(4) According to the illumination devices of (1) to (3), the illumination control unit includes a storage device storing a plurality of control patterns, and selects one control pattern by selecting from the plurality of control patterns and performs control according to the one control pattern selected.

According to the configuration of (4), since there is provided the storage device storing a plurality of control patterns, and one of the plurality of control patterns is selected and control is performed according to the one control pattern selected, variations in the temporal changes of one painting or the like may be increased.

(5) Preferably, the illumination devices of (1) to (4) include a transmission device for issuing an operation signal, and a reception device for receiving, and supplying to the illumination control unit, the operation signal from the transmission device, where the illumination control unit performs selection of a control pattern according to the operation signal.

The configuration of (5) is quite convenient in that, because the control pattern may be selected by operation of the transmission device, an arbitrary control pattern may be selected by operation from a sofa away from the painting or the like, for example.

(6) Preferably, the illumination devices according to (1) to (5) include an indicator lamp for emitting light of a plurality of colors, where the indicator lamp emits light of a color corresponding to a control pattern according to any one control pattern selected.

According to the configuration of (6), the current control pattern may be visibly checked by the indicator lamp which emits light of a color corresponding to the selected control pattern.

(7) According to the illumination devices of (1) to (6), preferably, the first illumination lamp is one of an ultraviolet lamp and an ultraviolet LED.

According to the configuration of (7), the first illumination lamp may be selected from an ultraviolet lamp and an ultraviolet LED according to the usage of the illumination device.

(8) According to the illumination devices of (1) to (7), preferably, the second illumination lamp is one of an incandescent lamp and a white LED.

According to the configuration of (8), the second illumination lamp may be selected from an incandescent lamp and a white LED according to the usage of the illumination device.

(9) A frame of the present invention is a frame provided with any one of the illumination devices of (1) to (8).

According to the configuration of (9), the same effect as that of the illumination devices of (1) to (8) may be achieved.

Advantageous Effects of Invention

According to the illumination device of the present invention and the frame provided with the illumination device, the demand of viewers who want to enjoy viewing a painting or the like while listening to a musical piece, with sound providing a great sense of ambience, may be fully met. Accordingly, viewers may experience deep relaxation by listening to a musical piece while viewing a painting or the like.

DESCRIPTION OF EMBODIMENTS

Hereinafter, specific embodiments of an illumination device according to the present invention, and a frame provided with the illumination device will be described in detail with reference to the drawings.

Figure 1:
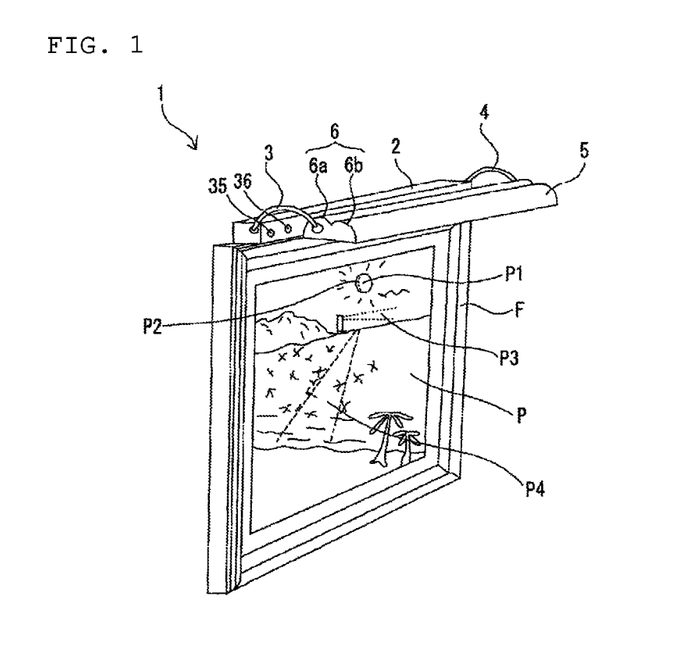
FIG. 1 shows a perspective view showing a state where an illumination device according to the present invention is attached to a frame, and a painting in a state where the illuminance of an incandescent lamp is at the maximum.

As shown in FIG. 1, an illumination device 1 is used by being attached to a frame F holding a painting P which is partially drawn with special paint that emits light by ultraviolet rays or that reflects ultraviolet rays. The painting P shown in the present embodiment depicts a scenery of a beach, and the sun, the mountain, the sea, the palm trees and the like are drawn with ordinary paint that is conventionally used, and a crescent moon-shaped figure P2 is drawn with special paint inside a circular figure P1 indicating the sun. Also, in the painting P, P3 indicating light of a light house and a figure P4 which is a reflection of the moonlight from the crescent moon on the surface of the sea are drawn with the special paint. Additionally, each of the figures P2, P3, and P4 drawn with special paint is shown in FIG. 1 by broken lines.

Furthermore, as shown in FIG. 1, the illumination device 1 includes a device main body 2 that is mounted and fixed on the top surface of the frame F, a first arm 3 whose base end is fixed to the left side of the device main body 2, a second arm 4 whose base end is fixed to the right side of the device main body 2, and an illumination unit 5 that is rotatably supported by the tip ends of the first and the second arms 3, 4.

A control circuit 23 (see FIG. 4) serving as an illumination control unit for turning on or off first and second illumination lamps described later is built into the device main body 2. Also, as shown in FIG. 1, the first and the second arms 3, 4 are each formed to have an arc shape and are hollow inside, and lead wires, not shown, are disposed inside the hollow first and second arms 3, 4. Additionally, the lead wires electrically connect the control circuit 23 (see FIG. 4) and an ultraviolet lamp (blacklight) 15 (see FIG. 3) serving as a first illumination lamp and a first incandescent lamp 16 to a fourth incandescent lamp 19 (see FIG. 3) serving as second illumination lamps, the lamps being disposed inside the illumination unit 5.

Figure 3:
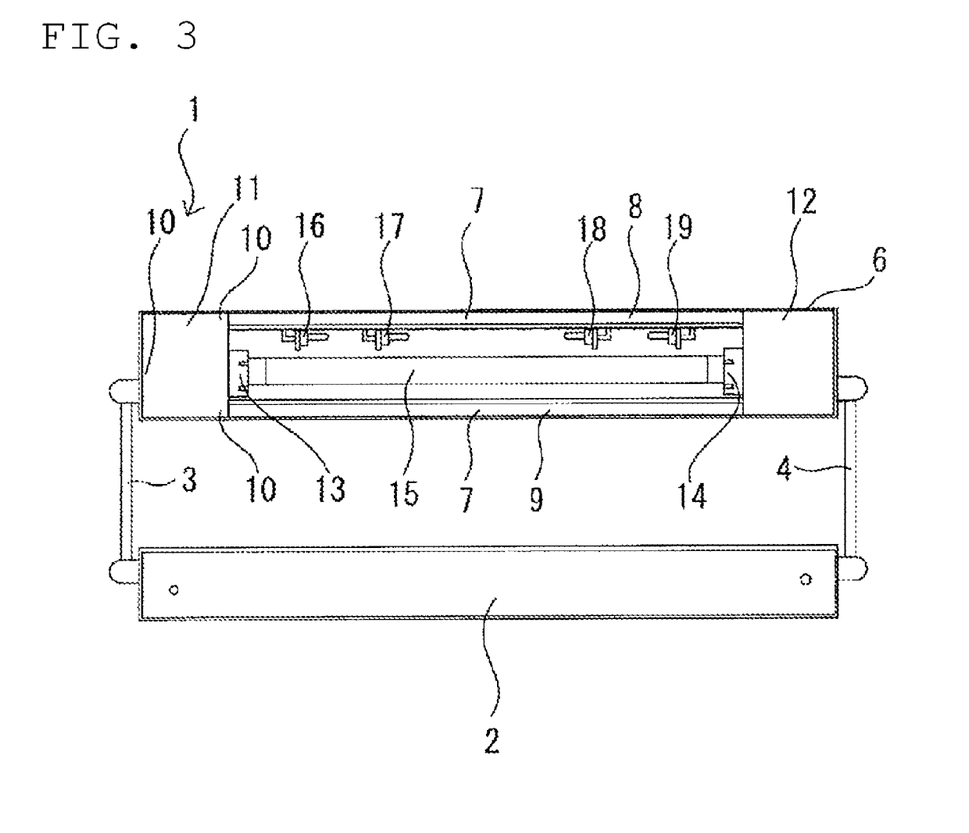
FIG. 3 is a bottom view showing a configuration of the illumination device.

Furthermore, as shown in FIG. 1, the illumination unit 5 attached to tip end portions of the first and the second arms 3, 4 includes a lampshade 6 having two arc-shaped parts 6a, 6b of integrally formed metal or synthetic resin, for example. As shown in FIG. 3, inside the lampshade 6, there are provided a long and narrow front-side attachment member 8 which is fixed on the inner forward surface of the lampshade 6 by a screw 7, and a long and narrow rear-side attachment member 9 which is fixed on the inner rearward surface of the lampshade 6 by a screw 7 and which is parallel to the front-side attachment member 8. Also, as shown in FIG. 3, left and right blocking plates 11, 12 are fixed to the left and right end sides of the front-side attachment member 8 and the rear-side attachment member 9 by screws 10. A pair of connectors 13, 14 including connection terminals is fixed on the back side of the left and right blocking plates 11, 12. The ultraviolet lamp 15 serving as the first illumination lamp is attached to the connectors 13, 14 in a detachable/attachable manner. Also, the first incandescent lamp 16 to the fourth incandescent lamp 19 are linearly attached on the rear side surface of the front-side attachment member 8.

Figure 4:
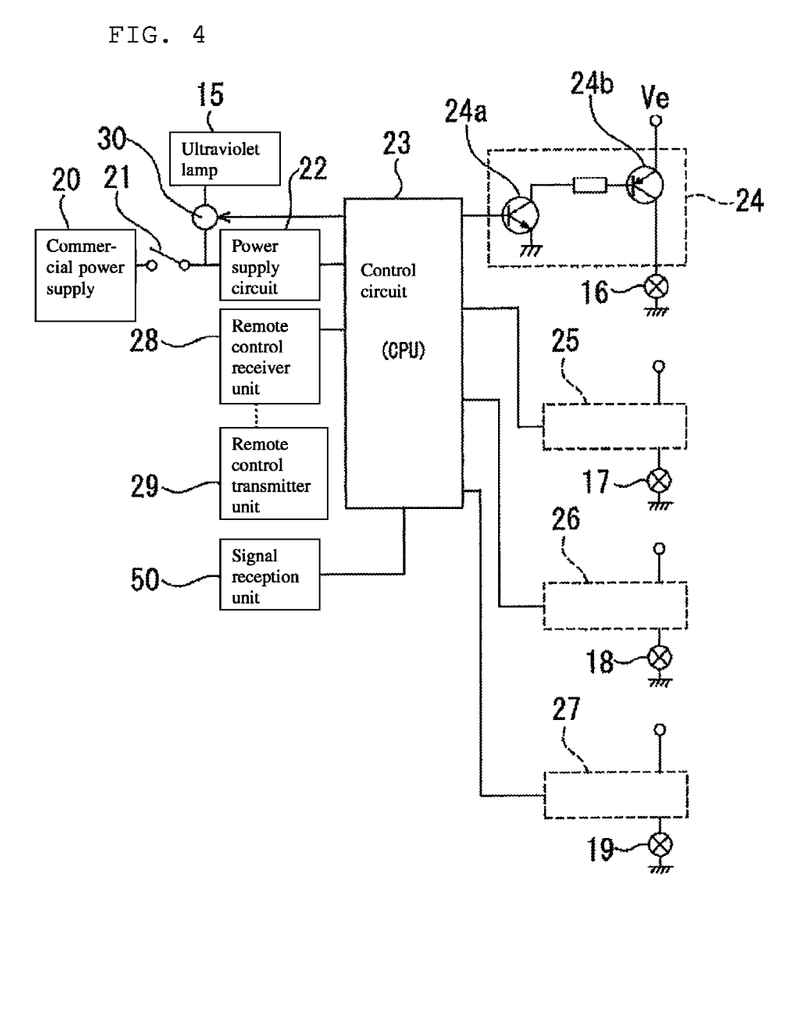
FIG. 4 is a block diagram showing a configuration of a control circuit of the illumination device.

Furthermore, the ultraviolet lamp 15 and the incandescent lamps 16 to 19 of the illumination device 1 are controlled by the control circuit built into the device main body 2. As shown in FIG. 4, the control circuit includes a CPU (Central Processing Unit) 23, and operating power is supplied thereto by a power supply circuit 22 to which power is supplied by a commercial power supply 20 via a main switch 21. Furthermore, the CPU 23 includes a storage unit, which is a storage device (memory), as described later, and is connected to the incandescent lamps 16 to 19 by a first driver circuit 24 to a fourth driver circuit 27, respectively. Also, the ultraviolet lamp 15 is connected to the commercial power supply 20 via the main switch 21 and a switching element 30. The switching element 30 is controlled by the CPU 23.

Moreover, as shown in FIG. 4, a remote control receiver unit 28 serving as a reception device is connected to the CPU 23. The remote control receiver unit 28 receives operation signals issued by a remote control transmitter unit 29 serving as a transmission device, and supplies the signals to the CPU 23. The CPU 23 is configured to enable various settings described later according to the operation signals. Furthermore, as shown in FIG. 4, a signal reception unit 50 is connected to the CPU 23. The signal reception unit 50 receives an analog audio signal, which is a musical piece with noises added thereto, from outside via a microphone (not shown), converts the signal into a digital audio signal, and supplies the digital audio signal to the CPU 23.

Figure 8A:
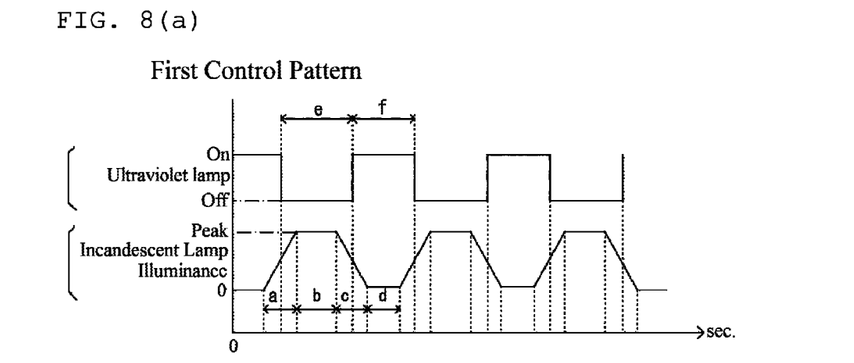
FIGS. 8(a) to 8(c) are graphs showing examples of a change over time in the illuminance of an ultraviolet lamp and the incandescent lamp.
Figure 8B:
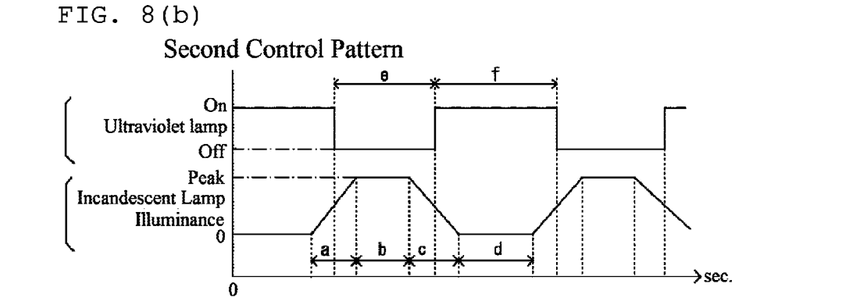
Figure 8C:
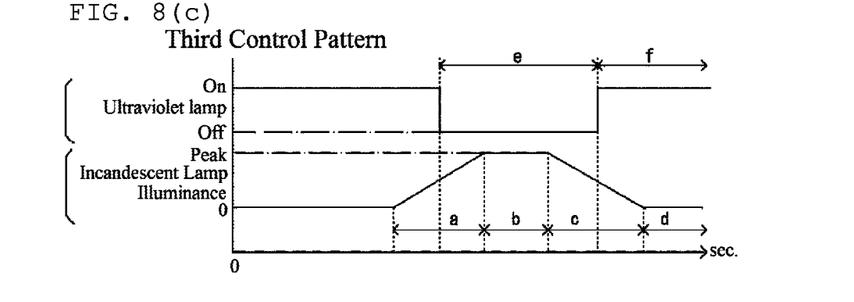

Each of the incandescent lamps 16 to 19 is controlled by the CPU 23 and the corresponding one of the driver circuits 24 to 27 to repeat turning on and off (see the graphs in FIGS. 8(a) to 8(c)). As shown in FIG. 4, each of the driver circuits 24 to 27 is configured from an NPN control transistor 24a whose base terminal is connected to the CPU 23, and a PNP driver transistor 24b whose base terminal is connected to a collector terminal of the control transistor 24a. An emitter terminal of the control transistor 24a is grounded. Also, a power supply voltage Ve is supplied to an emitter terminal of the driver transistor 24b. Moreover, as shown in FIG. 4, each of the incandescent lamps 16 to 19 has its positive terminal connected to a collector terminal of the driver transistor 24b and its negative terminal grounded.

Figure 2:
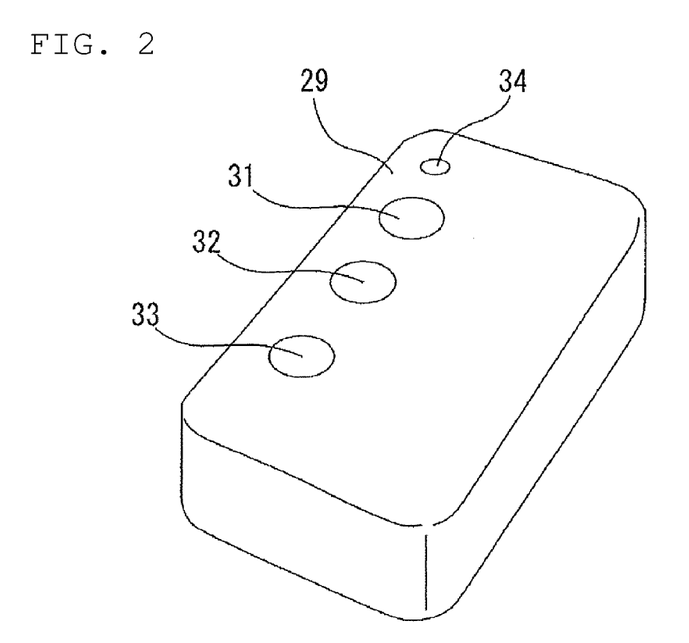
FIG. 2 is a perspective view showing a remote control transmitter unit used for the illumination device.

Furthermore, the CPU 23 is provided with a storage unit (not shown) serving as a storage device (memory). For example, the illuminance values of the ultraviolet lamp 15 and the incandescent lamps 16 to 19 responsive to temporal changes, that is, the control patterns, are stored in advance in the storage unit as first to third control patterns. Moreover, as shown in FIG. 2, a first switch 31 to a third switch 33 are provided to the remote control transmitter unit 29. The first switch 31 is for issuing operation signals for starting or stopping operation of the CPU 23. The second switch 32 is for issuing operation signals for stopping each of the incandescent lamps 16 to 19 whose illuminance is being gradually increased or reduced and the ultraviolet lamp 15 which is turned on or off so that the illuminance at the time is maintained, and for releasing the stopped state. The third switch 33 is for issuing an operation signal for selecting a specific control pattern from a plurality of control patterns, stored in the storage unit, regarding the timings of turning on or off the incandescent lamps 16 to 19 and the ultraviolet lamp 15. Moreover, as shown in FIG. 2, the remote control transmitter unit 29 is provided with an error lamp 34 for displaying to an effect that a predetermined operation of the illumination device 1 is not performed due to short-circuiting of the circuit or the like.

Furthermore, the illumination device 1 is provided with a first lamp 35 (see FIG. 1) serving as an indicator lamp for displaying, by being in a light-on state or light-off state, that the CPU 23 is operating, and that the incandescent lamps 16 to 19 and the ultraviolet lamp 15 are maintained at the illuminance at the time point. That is, the first lamp 35 is configured to be on in a case where the incandescent lamps 16 to 19 and the ultraviolet lamp 15 are maintained at the illuminance at the time point by operation of the second switch 32 provided to the remote control transmitter unit 29 (stopped state), and to be off when the stopped state is released. In addition to the first lamp 35, the illumination device 1 is also provided with a second lamp 36, as shown in FIG. 1. The second lamp 36 is for indicating, by the emission color, which control pattern the control pattern which is currently selected by the third switch 33 provided to the remote control transmitter unit 29 is, and is an indicator lamp constituting the present invention. Moreover, the second lamp 36 is configured to be turned on in red when the first control pattern is selected, to be turned on in green when the second control pattern is selected, and to be turned on in orange when the third control pattern is selected, for example. Additionally, the first lamp 35 and the second lamp 36 provided to the illumination device 1 in the above manner may alternatively be provided to a frame portion of the frame F.

Figure 5:
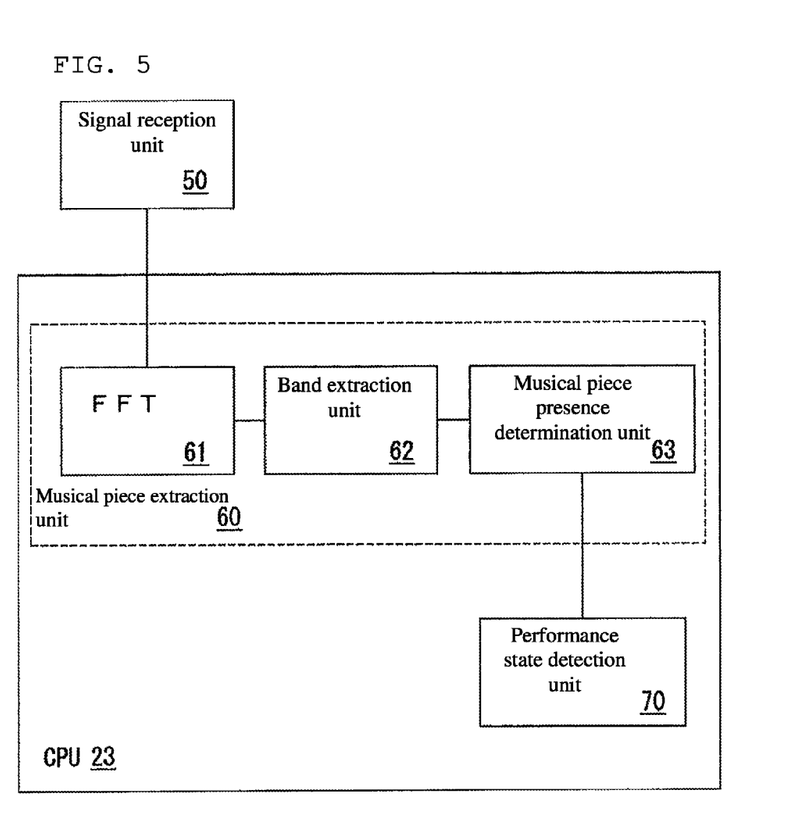
FIG. 5 is a block diagram showing an internal configuration of the control circuit.

FIG. 5 is a block diagram showing an internal configuration of the CPU 23. As shown in FIG. 5, the CPU 23 includes a musical piece extraction unit 60, and a performance state detection unit 70. The musical piece extraction unit 60 is for extracting, as a musical piece, continuous consonant sounds (hereinafter also referred to as continuous sounds) in a digital audio signal which has been digitally converted by the signal reception unit 50, and includes a fast Fourier transformer (hereinafter also referred to as FFT) 61 as a data conversion unit, a band extraction unit 62, and a musical piece presence determination unit 63. The FFT (Fast Fourier Transformer) 61 receives the digital audio signal from the signal reception unit 50, applies the Fourier transform on the digital audio signal, and generates frequency data. The band extraction unit 62 extracts data of a specific band corresponding to the continuous sounds from the frequency data. Here, as the specific band, the audible range of human beings may be cited. As the audible range of human beings, a frequency band of 27.5 Hz to 4186 Hz, which is the range of the notes of a piano, may be cited, but the frequency band is not limited to 27.5 Hz to 4186 Hz as long as it is audible to human beings. The musical piece presence determination unit 63 determines that the musical piece is present in the digital audio signal in response to extraction of data of the specific band by the band extraction unit 62. When the musical piece presence determination unit 63 determines that the musical piece is present in the digital audio signal, the performance state detection unit 70 detects start of performance of the musical piece. On the other hand, in a case where the state where data of the specific band is not extracted by the band extraction unit 62 continues for a period of time that is set in advance, the performance state detection unit 70 detects end of performance of the musical piece. The period of time that is set in advance here may be three seconds, for example. Furthermore, the CPU 23 turns on the ultraviolet lamp 15 and the incandescent lamps 16 to 19 at the same time as start of performance of the musical piece is detected, and turns off the ultraviolet lamp 15 and the incandescent lamps 16 to 19 at the same time as end of performance of the musical piece is detected. Additionally, the timing of turning off the lamps is not limited to the time of end of performance, and the lamps may be turned off when a predetermined period of time has passed from the end of performance. It is also possible to turn off the lamps before the end of performance by a predetermined period of time.

Figure 6:
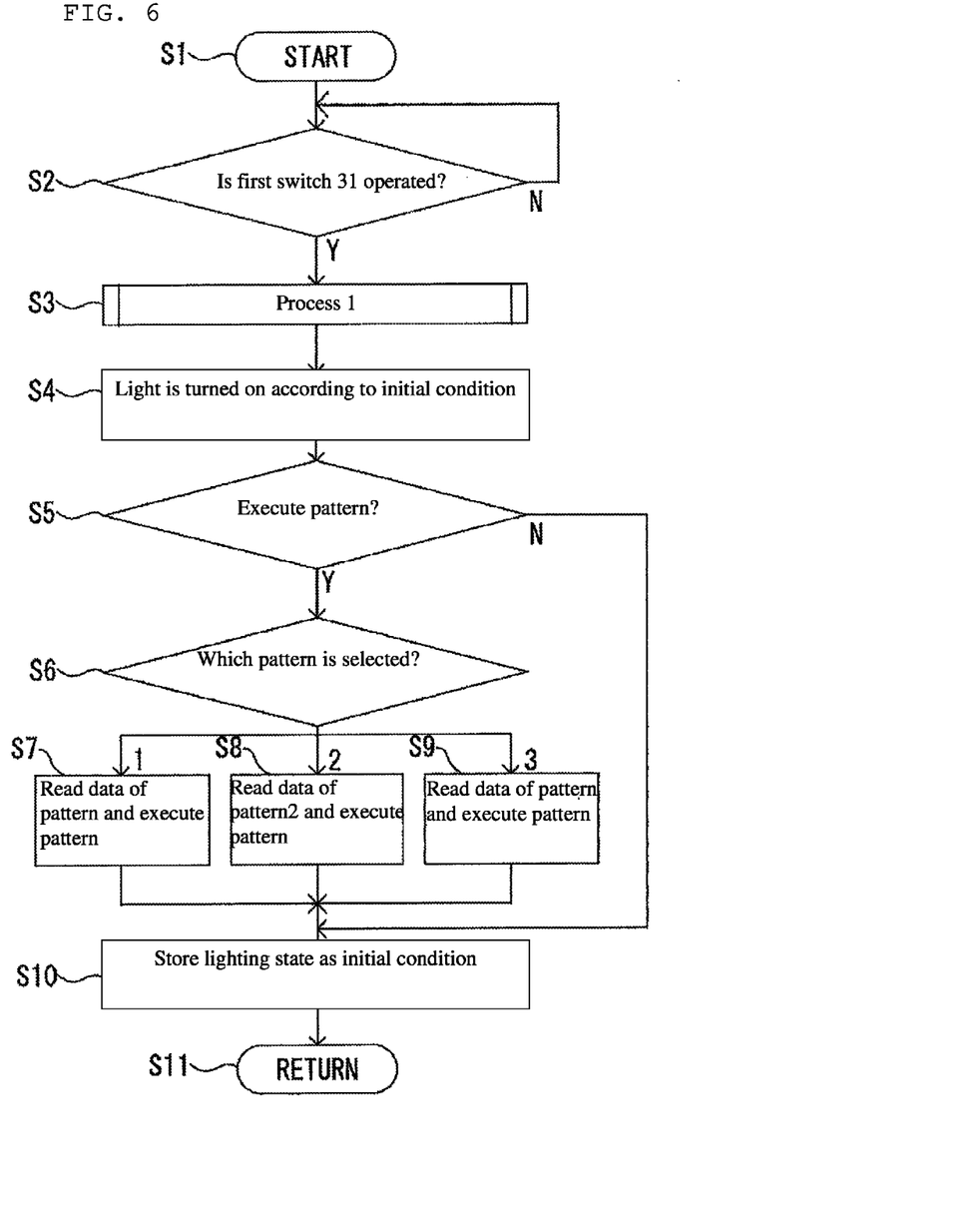
FIG. 6 is a flow chart showing an example of operation of the control circuit of the illumination device.

FIG. 6 is a flow chart showing operation of the control circuit of the illumination device. As shown in FIG. 6, according to the illumination device 1, when the main switch 21 is switched on, the CPU 23 starts operation in step S1, and in step S2, determines whether the first switch 31 is operated or not. Then, if there is no operation of the first switch 31, the process stays in step S2, and if there is operation of the first switch 31, the process proceeds to step S3. In step S3, the process proceeds to a routine process 1 (see FIG. 7). Then, when the routine process 1 is complete, the process proceeds to step S4. In step S4, the CPU 23 performs a light-on operation according to an initial condition stored in the storage unit. Then, in step S5, whether execution of a control pattern is selected by the second switch 32 or not is determined. If execution of a control pattern is not selected, the process proceeds to step S10, and if execution of a control pattern is selected, the process proceeds to step S6. In step S6, the CPU 23 determines which control pattern is selected, and proceeds to step S7 if the first control pattern is selected, proceeds to step S8 if the second control pattern is selected, and proceeds to step S9 if the third control pattern is selected. In step S7, data of the first control pattern is read from the storage unit and is executed, and the process proceeds to step S10. In step S8, data of the second control pattern is read from the storage unit and is executed, and the process proceeds to step S10. In step S9, data of the third control pattern is read from the storage unit and is executed, and the process proceeds to step S10. Then, in step S10, the current lighting state is stored in the storage unit as the initial condition, and the process returns after proceeding to step S11.

Figure 7:
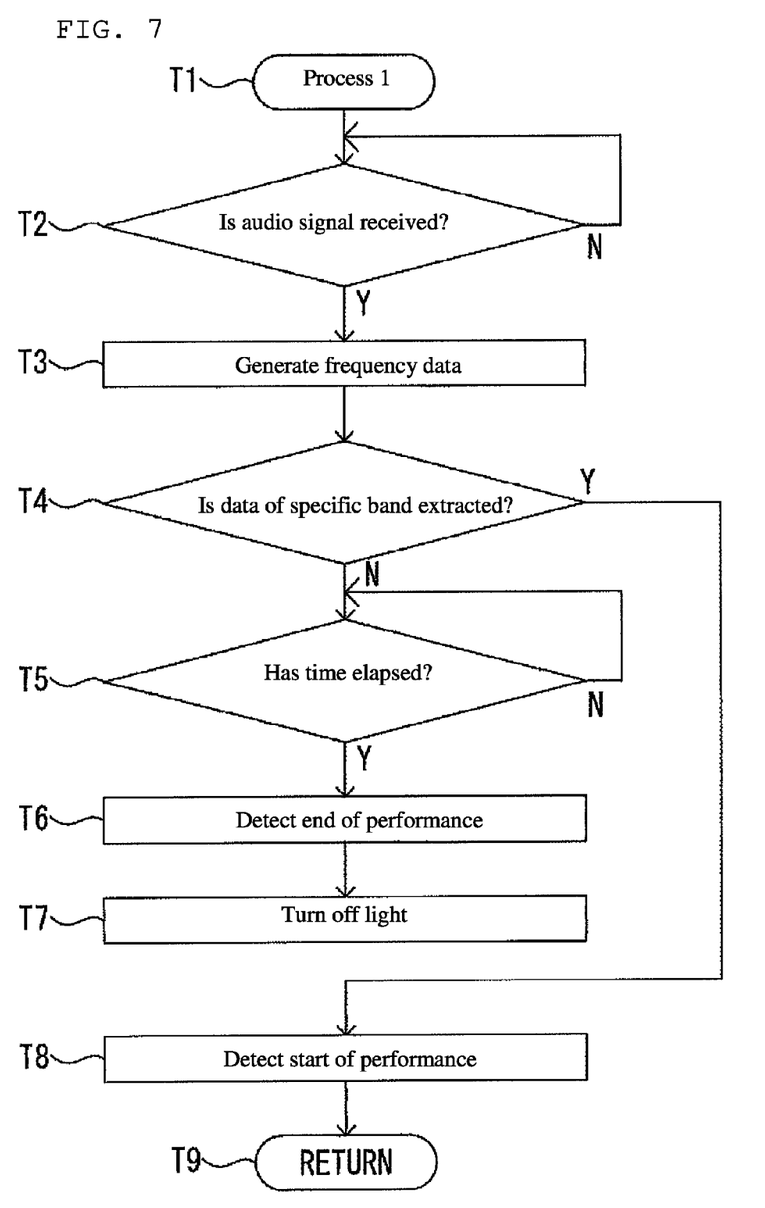
FIG. 7 is a flow chart showing an example of operation of the control circuit in a routine process.

FIG. 7 is a flow chart showing operation of the control circuit in the routine process 1. As shown in FIG. 7, in the routine process 1, the CPU 23 starts operation in step T1, and in step T2, determines whether the digital audio signal is received by the FFT 61. Then, if the digital audio signal is not received, the process stays in step T2, and if the digital audio signal is received, the process proceeds to step T3. In step T3, the FFT 61 applies the Fourier transform on the digital audio signal, and generates frequency data. Then, in step T4, the CPU 23 determines whether data of the specific band is extracted from the frequency data by the band extraction unit 62 or not. If data of the specific band is extracted, it is determined that the musical piece is present in the digital audio signal, and the process proceeds to step T8, and if data of the specific band is not extracted, the process proceeds to step T5. In step T5, the performance state detection unit 70 determines whether a state where data of the specific band is not extracted has continued for a period of time that is set in advance (three seconds) or not. If this state has not continued for the period of time that is set in advance, step T5 is repeated, and if it has continued for the period of time that is set in advance, the process proceeds to step T6. In step T6, the performance state detection unit 70 detects end of performance of the musical piece, and the process proceeds to step T7. In step T7, the CPU 23 turns off the incandescent lamps 16 to 19 and the ultraviolet lamp 15. Then, in step T8, the performance state detection unit 70 detects start of performance of the musical piece, and the routine process 1 is ended, and the process proceeds to step T9 to proceed to step S4 in FIG. 6.

FIGS. 8(a) to 8(c) are graphs showing examples of a change over time in the illuminance of the ultraviolet lamp and the incandescent lamps. FIG. 8(a) shows a change over time at the time of execution of the first control pattern. FIG. 8(b) shows a change over time at the time of execution of the second control pattern. FIG. 8(c) shows a change over time at the time of execution of the third control pattern. According to the illumination device 1, at the time of execution of the first control pattern, as shown in FIG. 8(a), when the main switch 21 is switched on to operate the power supply circuit 22 and also the first switch 31 of the remote control transmitter unit 29 is operated, each of the incandescent lamps 16 to 19 is placed in an on state (is turned on) after a lapse of a predetermined period of time (in this example, 20 seconds), and the illuminance is gradually increased in a first predetermined period of time a (in this example, 20 seconds) to reach its peak. Then, when a second predetermined period of time b (in this example, 25 seconds) has passed after the peak has been reached, each of the incandescent lamps 16 to 19 has its illuminance gradually reduced in a third predetermined period of time c (in this example, 20 seconds) to reach an off state (to be turned off), and is placed in an on state after a lapse of a fourth predetermined period of time d (in this example, 20 seconds), and control is performed to repeat these states.

Also, as shown in FIG. 8(*a*), in the first control pattern, the ultraviolet lamp 15 is controlled to repeat a control pattern in which it is turned off during a fifth predetermined period of time e, which is set in advance and which is during the time when the incandescent lamps 16 to 19 are turned on (i.e. the fifth predetermined period of time e is the time from the lapse of half of the first predetermined period of time a to the lapse of half of the third predetermined period of time c: in this example, 45 seconds), and is turned on during a sixth predetermined period of time f, which is set in advance and which includes the time when the incandescent lamps 16 to 19 are turned off (i.e. the sixth predetermined period of time f is the time from the lapse of half of the third predetermined period of time c to the lapse of half of the first predetermined period of time a of the next control pattern: in this example, 40 seconds).

Furthermore, according to the illumination device 1, at the time of execution of the second control pattern, as shown in FIG. 8(*b*), when the main switch 21 is switched on to operate the power supply circuit 22 and also the first switch 31 of the remote control transmitter unit 29 is operated, each of the incandescent lamps 16 to 19 is placed in an on state (is turned on) after a lapse of a predetermined period of time (in this example, 50 seconds), and the illuminance is gradually increased in the first predetermined period of time a (in this example, 30 seconds) to reach its peak. Then, when the second predetermined period of time b (in this example, 35 seconds) has passed after the peak has been reached, each of the incandescent lamps 16 to 19 has its illuminance gradually reduced in the third predetermined period of time c (in this example, 30 seconds) to reach an off state (to be turned off), and is placed in an on state after a lapse of the fourth predetermined period of time d (in this example, 50 seconds), and control is performed to repeat these states.

Also, as shown in FIG. 8(*b*), in the second control pattern, the ultraviolet lamp 15 is controlled to repeat a control pattern in which it is turned off during the fifth predetermined period of time e, which is set in advance and which is during the time when the incandescent lamps 16 to 19 are turned on (i.e. the fifth predetermined period of time e is the time from the lapse of half of the first predetermined period of time a to the lapse of half of the third predetermined period of time c: in this example, 65 seconds), and is turned on during the sixth predetermined period of time f, which is set in advance and which includes the time when the incandescent lamps 16 to 19 are turned off (i.e. the sixth predetermined period of time f is the time from the lapse of half of the third predetermined period of time c to the lapse of half of the first predetermined period of time a of the next control pattern: in this example, 80 seconds).

Moreover, according to the illumination device 1, at the time of execution of the third control pattern, as shown in FIG. 8(*c*), when the main switch 21 is switched on to operate the power supply circuit 22 and also the first switch 31 of the remote control transmitter unit 29 is operated, each of the incandescent lamps 16 to 19 is placed in an on state (is turned on) after a lapse of a predetermined period of time (in this example, 100 seconds), and the illuminance is gradually increased in the first predetermined period of time a (in this example, 60 seconds) to reach its peak. Then, when the second predetermined period of time b (in this example, 40 seconds) has passed after the peak has been reached, each of the incandescent lamps 16 to 19 has its illuminance gradually reduced in the third predetermined period of time c (in this example, 60 seconds) to reach an off state (to be turned off), and is placed in an on state after a lapse of the fourth predetermined period of time d (in this example, 100 seconds), and control is performed to repeat these states.

Also, as shown in FIG. 8(*c*), in the third control pattern, the ultraviolet lamp 15 is controlled to repeat a control pattern in which it is turned off during the fifth predetermined period of time e, which is set in advance and which is during the time when the incandescent lamps 16 to 19 are turned on (i.e. the fifth predetermined period of time e is the time from the lapse of half of the first predetermined period of time a to the lapse of half of the third predetermined period of time c: in this example, 100 seconds), and is turned on during the sixth predetermined period of time f, which is set in advance and which includes the time when the incandescent lamps 16 to 19 are turned off (i.e. the sixth predetermined period of time f is the time from the lapse of half of the third predetermined period of time c to the lapse of half of the first predetermined period of time a of the next control pattern: in this example, 160 seconds).

Figure 9A:
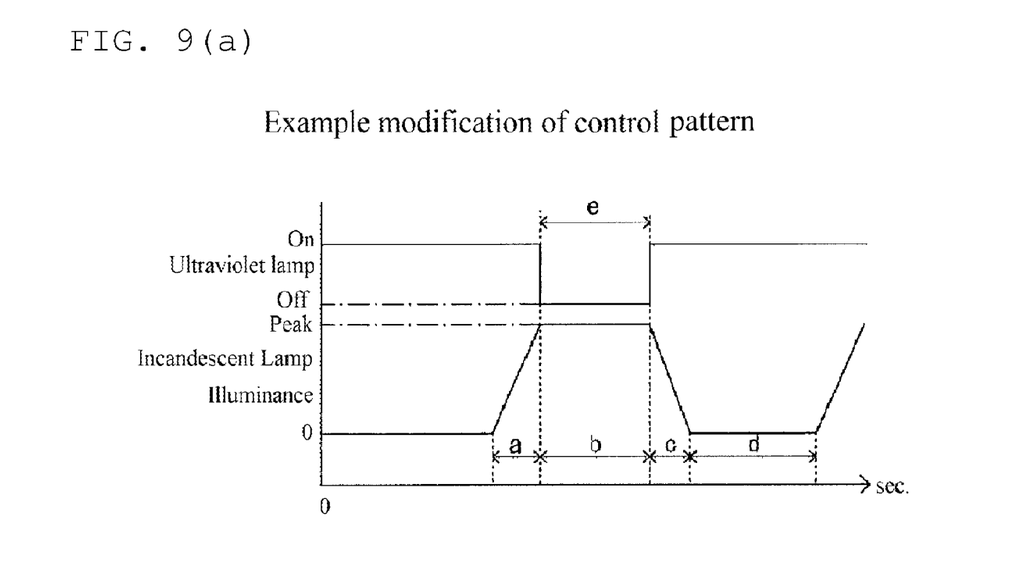
FIGS. 9(a) and 9(b) are graphs showing example modifications of control patterns shown in FIGS. 8(a) to 8(c).
Figure 9B:
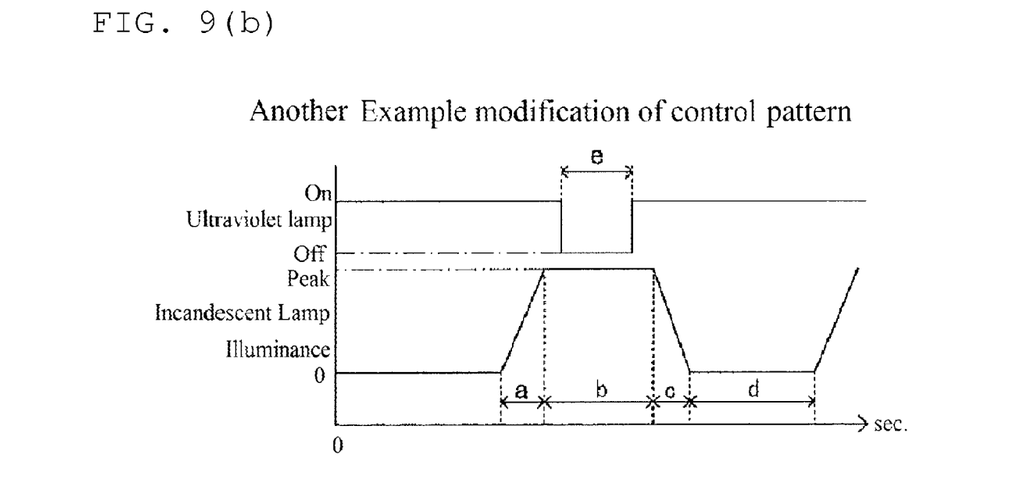

Additionally, the time when the ultraviolet lamp 15 is turned off (the fifth predetermined period of time e) may be controlled to be longer than the time when the illuminance of each of the incandescent lamps 16 to 19 is maintained at its peak, that is, the second predetermined period of time b as described above, but it may alternatively coincide with the second predetermined period of time b, as shown in FIG. 9(*a*), or it may be controlled to be shorter than the second predetermined period of time b, as shown in FIG. 9(*b*). Also, the illuminance of the ultraviolet lamp 15 may be controlled to be higher, equal to, or lower than the peak of the illuminance of each of the incandescent lamps 16 to 19.

That is, according to the illumination device 1, when the main switch 21 is operated to be on and the first switch 31 of the remote control transmitter unit 29 is operated, the ultraviolet lamp 15 is turned on, and also the CPU 23 is operated by the power supply circuit 22, and the incandescent lamps 16 to 19 and the ultraviolet lamp 15 are repeatedly turned on and off according to any of the first to the third control patterns shown in FIGS. 8(*a*) to 8(*c*), respectively, which are stored in the storage unit (not shown) of the CPU 23. At this time, illuminance values are read from the storage unit (not shown) by the CPU 23 according to the lapse of time, and the base current of the control transistor 24*a* is controlled by a DA converter, not shown, provided to the CPU 23. Then, the current flowing from the emitter of the driver transistor 24*b* to the collector is changed, and the value of current (illuminance) flowing to each of the incandescent lamps 16 to 19 is controlled.

Additionally, to stop changing the illuminance of the incandescent lamps 16 to 19 and the ultraviolet lamp 15 during control of the illuminance and to maintain the illuminance at the time point, the second switch 32 provided to the remote control transmitter unit 29 is operated. Moreover, to change (select) the control pattern of change of the illuminance of the incandescent lamps 16 to 19 and the ultraviolet lamp 15, the third switch 33 is operated.

Figure 10:
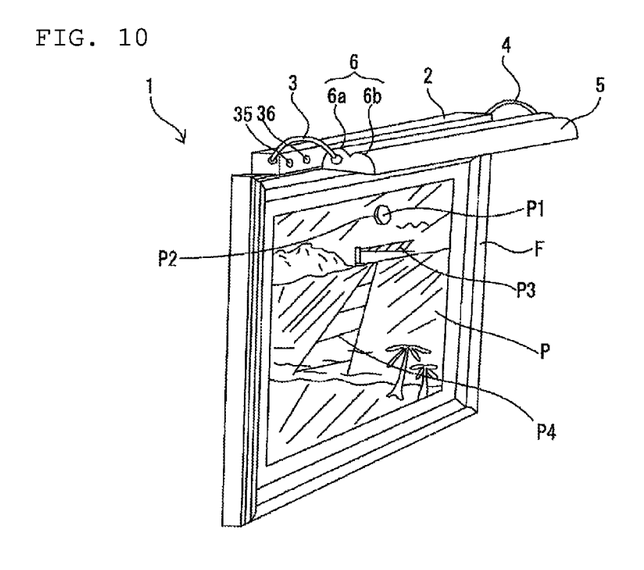
FIG. 10 is a perspective view showing a state where the illumination device according to the present invention is attached to a frame, and a painting in a state where the incandescent lamp is turned off.

As described above, according to the illumination device 1 of the present invention including each of the incandescent lamps 16 to 19 whose illuminance is changed according to a predetermined control pattern and the ultraviolet lamp 15 which is turned on or off according to a change in the illuminance of the incandescent lamps 16 to 19, when only the ultraviolet lamp 15 is turned on and the incandescent lamps 16 to 19 are turned off, the entire painting P is seen to be quite dark, as shown in FIG. 10. Also, at this time, the crescent moon-shaped figure P2, the figure P3 indicating light of a light house, and the figure P4, which is a reflection of the moonlight on the surface of the sea, which are painted with special painting that is caused to emit or reflect light by the ultraviolet rays from the ultraviolet lamp 15, are shown shining brighter than other parts painted with other paints. Accordingly, at this time, the painting P is viewed as showing a nighttime scenery.

Then, when a predetermined period of time passes from this state, the incandescent lamps 16 to 19 are turned on and their illuminance is gradually increased, as shown in FIGS. 8(*a*) to 8(*c*). When the illuminance of the incandescent lamps 16 to 19 is increased, the brightness of the entire painting P is increased little by little. At this time, the figures P2, P3, and P4 painted with the special paint gradually become unrecognizable, and then, when the ultraviolet lamp 15 is turned off and the illuminance of the incandescent lamps 16 to 19 reach its maximum, the figures P2, P3, and P4 become entirely unrecognizable. Accordingly, the entire painting P is viewed as showing a daytime scenery.

As described above, when the illumination device 1 is used on the painting P which is at least partially drawn with the special paint that emits light or reflects ultraviolet rays when irradiated with ultraviolet rays, the scenery shown in the painting P may be caused to gradually change according to a change in the nature over time, from a nighttime scenery to a morning scenery, a daytime scenery, an evening scenery, and a nighttime scenery. Accordingly, the illumination device 1 and a frame provided with the illumination device may offer a viewer a sense of ambience and a sense of surprise due to the change, and may thus offer deep relaxation.

Furthermore, according to the illumination device 1, the CPU 23 turns on the incandescent lamps 16 to 19 and the ultraviolet lamp 15 in response to detection of start of performance by the performance state detection unit 70, and turns off the incandescent lamps 16 to 19 and the ultraviolet lamp 15 in response to detection of end of performance by the performance state detection unit 70, and thus it is possible to fully meet the demand of viewers who want to enjoy viewing the painting P while listening to a musical piece, with sound providing a great sense of ambience. Accordingly, viewers may experience greater relaxation by listening to a musical piece while viewing the painting P.

While the embodiment of the present invention has been described with reference to the attached drawings, specific configurations are not limited to the embodiment. The scope of the present invention is defined not by the description of the embodiment, but by the appended claims, and includes all the equivalents and modifications falling within the scope of the appended claims.

Additionally, in the embodiment described above, a first illumination lamp, which is the ultraviolet lamp, and a second illumination lamp, which is the incandescent lamp, constituting the illumination device of the present invention are described to be provided to the illumination unit 5 which is rotatably supported at the tip ends of the first and the second arms 3, 4. However, the first illumination lamp and the second illumination lamp do not necessarily have to be provided to the illumination unit 5, and for example, the ultraviolet lamp, which is the first illumination lamp, may be attached to each of the left and right sides of a frame, not shown, where a painting is fixed, and the incandescent lamp, which is the second illumination lamp, may be attached to each of the upper and lower sides of the frame.

Furthermore, in the embodiment described above, the second illumination lamp is described to include four incandescent lamps 16 to 19. However, the number of incandescent lamps is not limited to four, and may be changed to three or less, or five or more.

Moreover, in the embodiment described above, an example is described where the first illumination lamp is configured by an ultraviolet lamp, and the second illumination lamp is configured by an incandescent lamp, but the present invention is not limited thereto, and the first illumination lamp may be configured by an ultraviolet LED (Light Emitting Diode), and the second illumination lamp may be configured by a white LED.

Moreover, in the embodiment described above, an example is described where an operation signal is issued by the remote control transmitter unit 29 serving as a transmission device to the remote control receiver unit 28 serving as a reception device to control on and off of the incandescent lamps 16 to 19 and the ultraviolet lamp 15, but the present invention is not limited thereto. For example, a mobile terminal capable of executing an application including a function of narrating information about a painting (guide function) or a function of reciting a poem written for each painting may be used to constitute the remote control transmitter unit serving as a transmission device, and the narration function or the recitation function may be executed according to an operation of selecting a painting by a viewer of paintings. The "mobile terminal" here may be configured by using a mobile information terminal or the like such as a smartphone, a cell phone, a tablet PC (Personal Computer) or a PDA (Personal Digital Assistant). The "narration of information about a painting" or "recitation of a poem" may be realized by output of audio from headphones connected to an earphone jack (a hole for plugging in the cord of an earphone) of a mobile terminal, or by performing transmission/reception of audio information by using near field communication compliant with near field communication standards such as Bluetooth or transmission/reception of infrared rays and by outputting audio from a speaker of the transmission device. Additionally, a viewer of paintings may freely switch between on and off of the narration function or the recitation function. Also, the viewer of paintings may freely change the pitch or speed of audio of the narration function or the recitation function. Furthermore, the narration function or the recitation function may be enhanced by realizing narration or recitation in multiple languages in consideration of foreigners viewing the paintings.

REFERENCE SIGNS LIST

1: Illumination device
2: Device main body
3, 4: Arm
5: Illumination unit
6: Lampshade
6*a*, 6*b*: Arc-shaped part
7, 10: Screw
8: Front-side attachment member
9: Rear-side attachment member
11: Blocking plate
13: Connector
15: Ultraviolet lamp (first illumination lamp)
16, 17, 18 19: Incandescent lamp (second illumination lamp)
20: Commercial power supply 21: Main switch
22: Power supply circuit
23: CPU (illumination control unit)
24, 25, 26, 27: Driver circuit
24a: Control transistor
24b: Driver transistor
28: Remote control receiver unit
29: Remote control transmitter unit
30: Switching element
31, 32, 33: Switch
34: Error lamp
35, 36: Lamp
50: Signal reception unit
60: Musical piece extraction unit
61: FFT (data conversion unit)
62: Band extraction unit
63: Musical piece presence determination unit
70: Performance state detection unit

The invention claimed is:

1. An illumination device comprising:
a signal reception unit capable of receiving an audio signal from outside and converting the audio signal into a digital audio signal;
a musical piece extraction unit capable of extracting continuous consonant sounds in the audio signal as a musical piece, comprising
  a data conversion unit capable of receiving the digital audio signal from the signal reception unit and generating frequency data by applying Fourier transform on data of the audio signal,
  a band extraction unit capable of extracting data of a specific band corresponding to the continuous consonant sounds from the frequency data, and
  a musical piece presence determination unit for determining that the musical piece is present in the audio signal, in response to extraction of the data of the specific band by the band extraction unit;
a performance state detection unit capable of detecting start/end of performance of the musical piece according to a result of extraction by the musical piece extraction unit,
  detecting the start of performance when the musical piece presence determination unit determines that the musical piece is present in the audio signal, and
  detecting the end of performance when a state where the data of the specific band is not extracted by the band extraction unit continues for a period of time that is set in advance;
a first illumination lamp capable of radiating ultraviolet rays at the start of performance when the musical piece is detected;
a second illumination lamp capable of radiating white light at the start of performance when the musical piece is detected; and
an illumination control unit capable of controlling on/off of the first illumination lamp, and of controlling on/off and illuminance of the second illumination lamp,
wherein the illumination control unit executes
  a first pattern that controls the second illumination lamp to repeat a pattern in which illuminance is gradually increased in a first predetermined period of time that is set in advance starting from an off state, maximum illuminance is maintained in a second predetermined period of time that is set in advance and that follows the first predetermined period of time, the illuminance is gradually reduced in a third predetermined period of time that is set in advance and that follows the second predetermined period of time, and the off state is maintained in a fourth predetermined period of time that is set in advance and that follows the third predetermined period of time,
  a second pattern that controls the first illumination lamp to repeat a pattern of being turned off in a fifth predetermined period of time that is set in advance and that is during a time when the second illumination lamp is turned on, and being turned on in a sixth predetermined period of time that is set in advance and that includes a time when the second illumination lamp is turned off, and
  a third pattern that causes the first and the second illumination lamps to be turned on in response to detection of the start of performance by the performance state detection unit, and causes the first and the second illumination lamps to be turned off in response to detection of the end of performance by the performance state detection unit.

2. The illumination device according to claim 1, wherein the illumination control unit includes a storage device storing a plurality of control patterns, and selects one control pattern by selecting from the plurality of control patterns and performs control according to the one control pattern selected.

3. The illumination device according to claim 2, comprising:
a transmission device for issuing an operation signal; and
a reception device for receiving, and supplying to the illumination control unit, the operation signal from the transmission device,
wherein the illumination control unit performs selection of a control pattern according to the operation signal.

4. The illumination device according to claim 3, comprising an indicator lamp for emitting light of a plurality of colors,
wherein the indicator lamp emits light of a color corresponding to a control pattern according to any one control pattern selected.

5. The illumination device according to claim 4, wherein the first illumination lamp is one of an ultraviolet lamp and an ultraviolet LED.

6. The illumination device according to claim 5, wherein the second illumination lamp is one of an incandescent lamp and a white LED.

7. A frame, wherein the frame is provided with the illumination device according to claim 6.

8. The illumination device according to claim 3, wherein the transmission device includes a first switch and a second switch, and
the illumination control unit comprises a memory device configured to
  determine whether the first switch is operated or not, and if the first switch is operated, the process proceeds to a first process,
  perform a light-on operation of the first illumination lamp and the second illumination lamp according to an initial condition stored in the memory device when the first process is complete, and
  determine whether execution of a control pattern is selected by the second switch or not,
    if execution of the control pattern is not selected, proceed to a second process, and
    if execution of the control pattern is selected proceed to a third process.

9. The illumination device according to claim 8, wherein, in the first process, the illumination control unit determines whether the digital audio signal is received by the data conversion unit, and if the digital audio signal is received, the data conversion unit applies the Fourier transform on the digital audio signal, and generates frequency data, determines whether data of the specific band is extracted from the frequency data by the band extraction unit or not, if data of the specific band is extracted, the musical piece is determined as present in the digital audio signal, and if data of the specific band is not extracted, the performance state detection unit determines whether the state where data of the specific band is not extracted has continued for a seventh predetermined period of time or not, if the state has not continued for the seventh predetermined period of time is repeated, determination of whether the state where data of the specific band is not extracted has continued for the seventh predetermined period of time or not is repeated, and if the has continued for the seventh predetermined period of time, the performance state detection unit detects end of performance of the musical piece, and turns off the first illumination lamp and the second illumination lamp.

10. The illumination device according to claim 9, wherein, in the second process, the memory device stores a lighting state as the initial condition, and proceeds to determining whether the first switch is operated or not.

11. The illumination device according to claim 10, wherein, in the third process, the illumination control unit determines which pattern of the first illumination lamp and the second illumination lamp is selected, and if the first control pattern is selected, data of the first control pattern is read from the storage unit and is executed, if the second control pattern is selected, data of the second control pattern is read from the storage unit and is executed, and if the third control pattern is selected, data of the third control pattern is read from the storage unit and is executed.

* * * * *